United States Patent [19]

Bleicher et al.

[11] 4,446,931

[45] May 8, 1984

[54] POWER DRIVEN HAMMER DRILL

[75] Inventors: Manfred Bleicher, Leinfelden; Manfred Buck, Filderstadt; Jörg Fälchle, Bempflingen; Karl Wanner, Leinfelden-Echterdingen, all of Fed. Rep. of Germany

[73] Assignee: Robert Bosch GmbH, Stuttgart, Fed. Rep. of Germany

[21] Appl. No.: 302,112

[22] Filed: Sep. 14, 1981

[30] Foreign Application Priority Data

Oct. 21, 1980 [DE] Fed. Rep. of Germany ....... 3039669

[51] Int. Cl.³ ........................ B23B 45/16; B25D 16/00

[52] U.S. Cl. ...................................... 173/48; 173/109; 173/116; 192/89 A; 192/96

[58] Field of Search ........................ 173/13, 14, 47, 48, 173/104, 109, 110, 111, 116, 128, 131, 133, 139; 74/371, 372, 60; 192/89 A, 96

[56] References Cited

U.S. PATENT DOCUMENTS

| | | | |
|---|---|---|---|
| 2,385,439 | 9/1945 | Gubbins | 173/13 |
| 2,824,455 | 2/1958 | Ristow et al. | 74/60 |
| 3,399,441 | 9/1968 | Imamura | 74/60 X |
| 3,800,901 | 4/1974 | Blomstrom et al. | 192/89 A X |
| 3,828,863 | 8/1974 | Bleicher et al. | 173/48 |
| 4,158,970 | 6/1979 | Laughon | 173/48 X |
| 4,280,359 | 7/1981 | Schmid et al. | 74/60 X |

FOREIGN PATENT DOCUMENTS

| | | | |
|---|---|---|---|
| 2820128 | 11/1979 | Fed. Rep. of Germany | 173/104 |

*Primary Examiner*—Frederick R. Schmidt
*Assistant Examiner*—Robert P. Olszewski
*Attorney, Agent, or Firm*—Michael J. Striker

[57] ABSTRACT

A power driven hammer drill has a tool impacting mechanism, a wobble unit for reciprocating the tool striking mechanism and having a drum member which can be releasably coupled with an intermediate shaft driven by a motor, wherein a switching device is provided outside of a hammer drill housing and arranged so as to disengage a coupling element of the intermediate shaft out of a coupling element of the drum member of the wobble unit against the action of a spring.

22 Claims, 5 Drawing Figures

POWER DRIVEN HAMMER DRILL

BACKGROUND OF THE INVENTION

The present invention relates to a power driven hammer drill.

Power driven hammer drills are known in the art and disclosed, for example, in the German Offenlegungsschrift 2,449,191. In known hammer drills, a tool impact mechanism is automatically switched to its operative position when a tool held in a tool holder is placed on a work piece to be worked. This is performed because of a longitudinal displacement of the tool holder, wherein a coupling is actuated for displacement of the tool impact mechanism. For holding the coupling in its engaging position, the user must always overcome the force of a spring which urges the coupling out of its engagement. Clean boring without axially loading of the tool is not possible in the known hammer drills.

SUMMARY OF THE INVENTION

Accordingly, it is an object of the present invention to provide a power driven hammer drill which avoids the disadvantages of the prior art.

More particularly, it is an object of the present invention to provide a power driven hammer drill in which during the impact operation, if desired by a user, a coupling via which a wobble unit is switched to displacement, is retained by a coupling in engaged position.

In keeping with these objects and with others which will become apparent hereinafter, one feature of the present invention resides, briefly stated, in a power driven hammer drill in which switch means is provided located outside of a housing of the hammer drill and arranged so as to disengage a coupling element of a driving intermediate shaft out of a coupling element of a driven drum member of a wobble unit against the action of a spring.

When the power driven hammer drill is designed in accordance with the present invention, and the wobble unit is retained in its operating position, manipulability of the hammer drill is considerably facilitated. Moreover, the hammer drill may be utilized as a drilling machine. This opens a possibility to use the hammer drill which is light and suitable for household applications. This machine uses an air-cushion striking mechanism which is highly effective but was utilized up to now only in relatively heavy hand-held machines.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
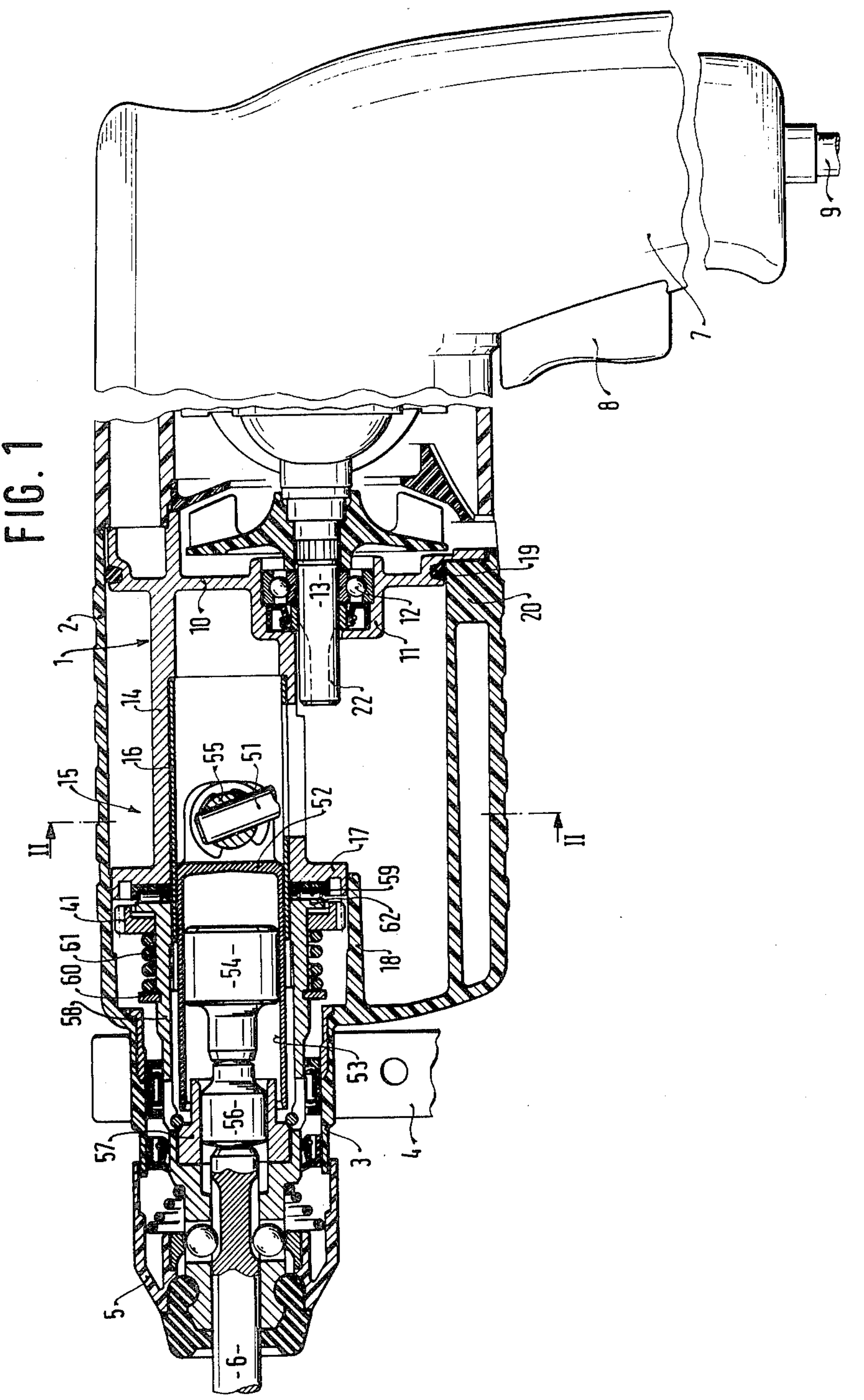
FIG. 1 is a partially sectioned view showing a power driven hammer drill in accordance with the present invention.

A power driven hammer drill shown in FIG. 1 has a drive housing 1 of metal and a synthetic plastic jacket 2 surrounding the housing. The jacket 2 has at its front end a cylindrical extension 3 which is formed for fixing additional elements, such as for example, a handle 4. A tool holder 5 is arranged in the front end of the jacket extension 3 and serves for holding a partially shown tool, such as a drill 6. A piston handle 7 is formed at the rear end of the jacket 2 facing away from the tool holder 5. A switch turning on the hammer drill to its operative position is accommodated in the piston handle 7 and provided with a trigger 8. A current conducting cable 9 is inserted into the lower end of the pistol handle 7 with interposition of an elastic socket.

The drive housing 1 has a transverse wall 10 with a supporting portion 11 for a bearing formed as ball bearing 12. An armature shaft 13 of an electric motor is arranged in the bearing 12. The electric motor of which only the front part of the armature shaft 13 is shown, is located at an opposite side of the transverse wall 10 relative to the tool holder 5. The transverse wall 10 has a tubular extension 14 at its side facing away from the electric motor, and a cylindrical bush 16 for an air cushion striking mechanism 15 is arranged in the extension 14. The extension 14 has at its front end facing toward the tool holder 5, a flange 17 which engages in a tubular fitting 18 in the interior of the jacket 2 and thereby supports the housing 1 at its front side.

As can be seen from FIG. 1, the drive housing 1 abuts at its other side with the transverse wall 10 against the inner surface of the jacket 2. The O-ring 19 is accommodated in an annular groove provided on the outer edge of the transverse wall 2 and contacts the rear wall of the jacket 2 with some bias. The transverse wall 10 abuts in the axial direction against thickened parts of the wall of the jacket 2, forming lugs 20.

Figure 2:
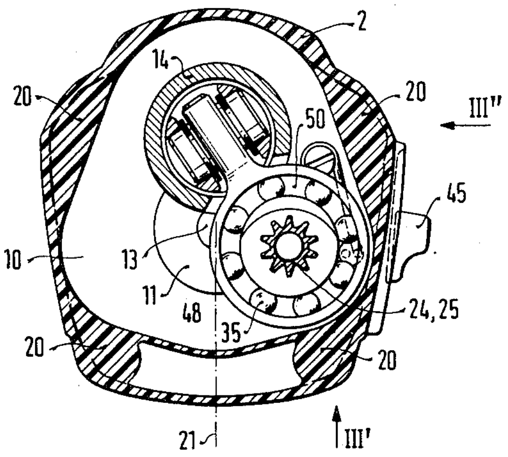
FIG. 2 is a view showing a section of the inventive hammer drill taken along the line 2—2 in FIG. 1.

As can be seen from FIG. 2, the extension 14 and the support 11 which concentrically guides the armature shaft 13 are arranged in a longitudinal central plane 21 of the hammer drill. The end portion of the shaft 13, which is located in the ball bearing 12, supports a motor pinion 22. The pinion 22 engages with a gear 23 which is non-rotatably seated on an intermediate shaft 24. The intermediate shaft 24 is laterally offset from the longitudinal central plane 21 and has an outer toothing 25 which may be formed as a spline shaft toothing and extends over the entire length of the intermediate shaft 24. The intermediate shaft 22 has an end portion facing toward the transverse wall 10 and held in a grooved ball bearing 26. It abuts, because of the turning off of the outer toothing 25 in the region of the grooved ball bearing 26, against a shoulder provided on the inner ring of the grooved ball bearing 26. The outer ring of the ball bearing 26 is held in a correspondingly formed recess 26' provided in the transverse wall 10, as can be seen from FIG. 3. The outer ring of the ball bearing 26 supports on the bottom of the recess 26′ in such a manner that the axial force transmitted from the intermediate shaft 24 can be applied onto the transverse wall 10.

The intermediate shaft 24 has an end portion facing away from the ball bearing 26 and provided with a coaxial bore 27. A spring 28 is arranged in the bore 27. A shaft part 29 extends outwardly of a free end of the bore 27 at the front side and is telescopically displaceable against the force of the spring 28 in the bore 27. A free end of the shaft part 29 is held in a needle bearing 30. The shaft part 29 has an end side which is held by the spring 28 axially against a plate 32 arranged on the bottom of a recess 31 for the needle bearing 30. The recess 31 is formed in the jacket 2 which can be composed of a glass fiber reinforced synthetic plastic material.

A drum member 33 of a wobble drive for the air cushion striking mechanism 15 is arranged on the intermediate shaft 24. The drum member 33 has an outer surface provided with a single circumferentially closed groove 34 extending in a plane which is inclined to the axis of the drum member 33. A plurality of balls 35 are received in the groove 34. The drum member 33 is connected with the intermediate shaft 24 in an uncoupling manner with the aid of positive coupling elements. Coupling elements include the outer toothing 25 of the intermediate shaft 24, on the one hand, and an annular toothing 36 provided in the bore of the drum member 33. In coupled condition shown in FIG. 3 the release groove 37 lies axially at the side facing toward the groove ball bearing 26 adjacent to the inner toothing 36. The axial width of the release groove 37 is greater than the width of the annular inner toothing 36 of the drum member 33.

The driving gear 23 provided with inner spline connection is arranged on the outer toothing 25 at the end portion facing toward the bearing 26 in non-rotatable and axially movable manner on the intermediate shaft 24. As can be seen from FIGS. 3 and 4, the teeth of the outer toothing 25 in the region of the drum member 33 and the driving gear 23 has a reduced tooth height as compared with the teeth in a remaining region of the intermediate shaft 24. A transition 38 between the reduced teeth and not reduced teeth forms an axial abutment for the drum member 33 at its end side facing away from the driving gear 23.

The bore in the drum member 33 corresponds, at least in the region of the annular inner toothing 36, to the reduced tooth height of the outer toothing 25 of the intermediate shaft 24. Thereby, the drum member 33 abuts with the annular inner toothing 36 against the intermediate shaft 24, on the one hand. On the other hand, the drum member 33 abuts with an axially projecting flange 39, against the driving gear 23. In the position shown in FIG. 3, in which the coupling element 25 (the outer toothing) of the intermediate shaft 24 are in engagement with the counter coupling elements 36 (the inner toothing) of the drum member 33, the spring 28 biases the intermediate shaft with the axial abutment (the transition 38) against the drum member 33. The latter axially abuts against the driving gear 23 which in turn abuts against the inner ring of the grooved ball bearing 26.

The outer toothing 25 of the intermediate shaft 24 has a shape which is suitable for transmission of rotary movement, such as for example an involute toothing. Thereby, the front part of the toothing which faces away from the bearing 26 and has not reduced tooth height forms a driven pinion 40 of the intermediate shaft 24. The driven pinion 40 engages with a gear 41 which drives in rotation the tool holder 5 which carries the drill 6.

Figure 3:
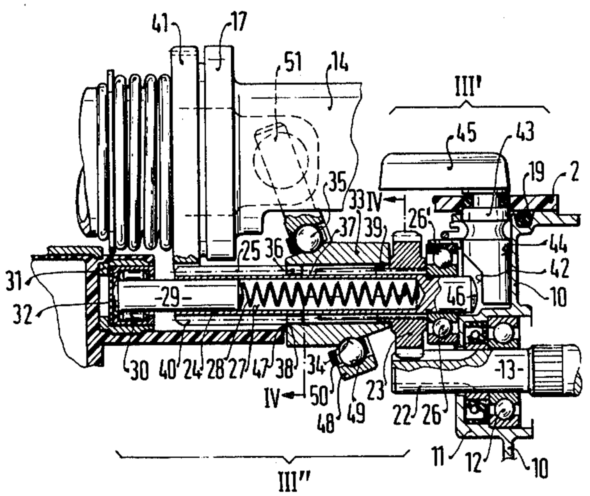
FIG. 3 is a developed view of a drive of the inventive hammer drill which contains two sections turned about an axis of an intermediate shaft in the plane of the drawings, wherein the observation direction is identified by reference III' and III"
Figure 4:
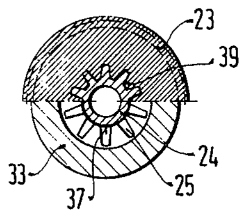
FIG. 4 is a view showing a longitudinal section of the intermediate shaft of the inventive hammer drill, taken along the line 4—4 in FIG. 3 in the position of use corresponding to FIG. 1.

In the position shown in FIG. 3, the drum member 33 is in its coupled condition in which it is driven in rotation from the intermediate shaft 24. For interrupting the rotary connection between the intermediate shaft 24 and the drum member 33, that is to stop the operation of the air cushion striking mechanism 15, the intermediate shaft must be displaced forwardly in direction toward the tool holder 5. Outwardly actuating switch means is arranged for this purpose and serves for uncoupling the striking mechanism. The switching means is formed as an eccentric 42 on a switch shaft 43. The switch is guided in an associated bore 44 formed in the transverse wall 10.

In the operative position of the hammer drill, the axis of the switch shaft 43 and the bore 44 is horizontal. The switch shaft 43 has an outer end extending from the housing of the hammer drill and carrying an actuating button 45. (See FIGS. 2 and 3). As can be seen from FIG. 3, the eccentric 42 is formed so that its rear end 46 extending outwardly beyond the bearing 26 and formed spherical, do not contact the intermediate shaft 24 in the position in which the striking mechanism is switched on. When the actuating bottom 45 is turned from the position shown in FIG. 3 by 180°, the outer face of the switch shaft 43 with the spherical end 46 contacts the intermediate shaft 24 so that it is finally displaced forwardly against the force of the spring 28. Thereby the above-mentioned axial bias of the drum member 33 via the gear 23 against the housing of the hammer drill is lifted. During the forward movement of the intermediate shaft 24 the front end side of the drum member 33 comes into contact with an abutment 47 formed by a part of the machine housing and thereby is limited in its axial displacement. Thereby the inner toothing 36 of the drum member 33 is pressed out of the outer tooth 25 of the intermediate shaft 24 and displaced in the release groove 37. The rotary connection between the intermediate shaft and the drum member 33 of the wobble drive is thus interrupted. The intermediate shaft which rotates further drives, however, the gear 41 in rotation so that pure drilling operation of the hammer drill is possible. The eccentric 42 is not loaded in axial direction by the spring 28 only in the event of the switched off air cushion striking mechanism when no load is applied to the machine. With switch-on striking mechanism, the eccentric 42 is completely unloaded from the force of the spring 28. The force of the spring is fully available for elimination of the axial play of the drum member 33. In this manner, a minimum noise generation takes place on the one hand. On the other hand, the elastic bias of the drum member 33 against the housing of the hammer drill guarantees complete absence of axial play which can be caused by manufacturing tolerances and wear.

An outer groove 49 is provided in a ring 48 and associated with the groove 34 of the drum member 33. The balls 35 are arranged both in the groove 34 and in the groove 49. In order to maintain a predetermined distance between the balls, the balls can be guided in a cage 50 as known in ball bearings. A wobble finger 51 is formed of one-piece with the ring 48 and acts to reciprocate the air cushion striking mechanism 15 of the hammer drill.

The striking mechanism of the hammer drill is arranged in the interior of the stationary bush 16 provided in the extension 14. It includes a cup-shaped piston 52 which is guided in the bush 16 in tight and sliding manner and has a cylindrical bore 53. A striker 54 which is formed as a free flowing piston is arranged in the bore 53 also in tight and sliding manner. The piston 52 has a fork shaped rear end portion which faces away from the tool holder 5 and carries a pivot pin 55. A transverse bore is provided centrally of the pivot pin, and the above-mentioned wobble finger 51 engages in the transverse bore with a small movement play. Thereby, the wobble finger 51 can easily move in axial direction in the transverse bore. The bore 53 has a front end region facing away from the wobble finger 51, and an inner end of an intermediate anvil 56 extends into this end region. The intermediate anvil is guided axially movable in a support sleeve 57. The intermediate anvil contacts with its front end, in a conventional manner, the inner end of the drill 6 which is held in the tool holder 5 in axially displaceable but non-rotatable way.

The support sleeve 57 is further mounted in the interior of a rotary sleeve 58 which is rotatably guided in the extension 3. The rear end of the rotary sleeve 58 abuts via an axial needle bearing 59 against the flange 17 of the extension 14 of the transverse wall 10. In a radial direction, the rotary sleeve is guided in its rear region facing towards the needle bearing 59 on the end portion of the bush 16, the end portion extending outwardly beyond the extension 15. The gear 41 which engages with the intermediate shaft 24 is rotatably guided on the cylindrical outer wall of the rotary sleeve 58. The spring ring 60 is inserted in an associated groove of the rotary sleeve 58 and a pressure spring 61 abuts against the spring ring 60. The body of the gear 41 has an end face facing toward the motor and carrying coupling claws. The body of the gear 41 with its coupling claws is retained by the pressure spring 61 in engagement with associated coupling claws provided at a rear flange 62 of the rotary sleeve 58. The strength of the pressure spring 61 is selected so that the gear 41 in the event of normal drilling moment is retained in engagement with the rear flange of the rotary sleeve via the coupling claws. When an operating moment is attained, the rotary connection between the gear 41 and the rotary sleeve 58 is interrupted. As can be clearly seen, the rotary movement of the drum member 33 provides for a reciprocating movement of the cup-shaped piston 52. An air cushion which is formed between the piston 52 and the striker 54 serves as an energy accumulator and drives the striker in axial reciprocating movement. During meeting with the inner end of the intermediate anvil 56, the striker 54 transmits its energy to the latter which finally acts upon the tool supported in the tool holder 5 as an axial impact. The above-described safety coupling composed of the gear 41 and the rear flange 62 of the rotary sleeve 58 drives the tool, that is the drill 6, in rotation.

By actuation of the eccentric 42 arranged on the switch shaft 43 the operation of the striking mechanism can be terminated. Since the air cushion striking mechanism in this case is completely immovable, absolutely vibration free running during striking operation as well as drilling operation is attained. It has been shown that the wobble unit in each operating condition of the hammer drill can be switched on.

Figure 5:
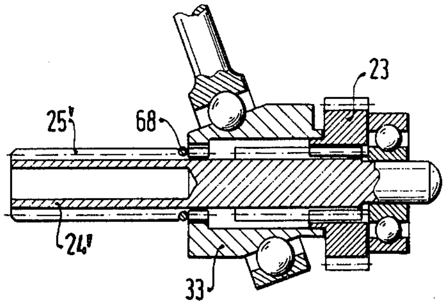
FIG. 5 is view substantially corresponding to the view of FIG. 3 but showing further embodiment of the present invention.

The power driven hammer drill in accordance with a second embodiment of the invention is shown in FIG. 5 and has an intermediate shaft 24′ which differs from the intermediate shaft 24 of the first embodiment in the fact that the tooth size of an outer toothing 25′ is identical over the entire length of the intermediate shaft 24. In the first embodiment, the axial abutment which is required for the axial displacement of the drum body 33 or for the axial biasing the drum member 33 in coupled condition is formed by the transition 38 between the teeth of reduced height and the teeth of not reduced height of the outer toothing 25. In contrast, this abutment in the second embodiment is formed by a round ring 68 which is arranged in at least one recess of the intermediate shaft 24′. The recess is formed as an annular groove with parts which are cut in each tooth of the outer toothing 25′. Naturally, when the annular groove is cut deeper, the recess extends into the core of the intermediate shaft 24′.

The functions of the intermediate shaft 24′ of the second embodiment is identical to the functions of the intermediate shaft 24 of the first embodiment of the invention.

It will be understood that each of the elements described above, or two or more together, may also find a useful application in other types of constructions differing from the types described above.

While the invention has been illustrated and described as embodied in a power driven hammer drill, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A power driven hammer drill, comprising a housing having an axis; a tool striking means arranged to reciprocate in said housing; drive means including a wobble unit with a limitably axially displaceable drum member and a transmitting member reciprocating said tool striking means, a drive motor formed as an electric motor with a pinion, an intermediate shaft having a passage and rotatable by said drive motor, a driving gear arranged on said intermediate shaft in non-rotatable and axially displaceable manner relative thereto and engageable with said pinion of said electric motor, means for releasably coupling said intermediate shaft with said drum member of said wobble unit and including a first coupling element provided on said drum member and a second coupling element provided on said intermediate shaft and positively engageable with said first coupling element of said drum member, a bearing which transmits axial forces, supports said intermediate shaft and has an inner ring, spring means arranged to act so as to bring said second coupling element of said intermediate shaft into interengagement with said first coupling element of said drum member, said spring means including a spring element accommodated in said passage of said intermediate shaft and prestressing the latter with an axial abutment against said drum member in engaged condition, whereas said drum member axially abuts said driving gear, and said driving gear abuts against said inner ring of said bearing; and switch means located outside of said housing and arranged so as to disengage said second coupling element of said intermediate shaft out of said first coupling element of said drum member against the action of said spring means.

2. A power driven hammer drill as defined in claim 1, wherein said tool striking means includes a striker element and driving element arranged to displace said striker element via an air cushion.

3. A power driven hammer drill as defined in claim 1, wherein said housing has a part, said drum member of said drive means abutting against said part in said housing.

4. A power driven hammer drill as defined in claim 1, wherein said switch means includes an eccentric element which contacts said intermediate shaft only in its disengaged condition.

5. A power driven hammer drill as defined in claim 1, wherein said first coupling element of said drum member is formed as an inner toothing, said second coupling element of said intermediate shaft being formed as an outer toothing.

6. A power driven hammer drill as defined in claim 5, wherein said inner toothing of said drum member has a predetermined metal width, said intermediate shaft having a predetermined length, and said outer toothing of said intermediate shaft extending over the entire length of said intermediate shaft and having an undercut with an axial width corresponding to the axial width of said inner toothing of said drum member.

7. A power driven hammer drill as defined in claim 5; and further comprising tool rotating means, said outer toothing of said intermediate shaft being formed os as to engage said tool rotating means and to rotate the latter so as to thereby rotate the tool.

8. A power driven hammer drill as defined in claim 7, wherein said outer toothing of said intermediate shaft is formed as an involute toothing.

9. A power driven hammer drill as defined in claim 7, wherein said tool rotating means includes a gear driving the tool in rotation, said drive means including a drive pinion engaging with said gear and engaged by said outer toothing of said intermediate shaft.

10. A power driven hammer drill as defined in claim 1, said driving gear engages with said intermediate shaft by a spline connection.

11. A power driven hammer drill as defined in claim 1, wherein said first coupling element of said drum member is formed as an inner toothing, said second coupling element of said intermediate shaft being formed as an outer toothing, said driving gear having an axial projection, said drum member radially abutting with said inner toothing against said intermediate shaft at its one side, and against said axial projection of said driving gear at its other side.

12. A power driven hammer drill as defined in claim 1, wherein said bewring is formed as grooved ball bearing.

13. A power driven hammer drill as defined in claim 1, wherein said intermediate shaft has a recess, said axial abutment being formed as a round ring inserted in said recess of said intermediate shaft.

14. A power driven hammer drill as defined in claim 1, wherein said first coupling element of said drum member is formed as an inner toothing, said second coupling element of said intermediate shaft being formed as an outer toothing, said intermediate shaft having a portion on which said drum member and said driving gear are arranged said outer toothing of said intermediate shaft having a plurality of teeth arranged so that teeth provided on said portion have a reduced tooth height as compared with teeth of a remaining portion of said intermediate shaft.

15. A power driven hammer drill as defined in claim 1, wherein said tool striking means includes a striker element and a driving element arranged to displace said striker element via an air cushion and having a pivot pin with a transverse opening, said drum member having an axis and an outer surface provided with a circumferentially complete annular groove inclined to said axis, said transmitting member being formed as a ring member having an inner surface provided with a further groove, said wobble unit further including a plurality of ball members received in said groove of said drum member and said further groove of said ring member, said ring member having a body part and a finger formed of one piece with said body part and extending into said transverse opening of said pivot pin to be longitudinally guided in said transverse opening with a direct surface contact.

16. A power driven hammer drill as defined in claim 15, wherein said wobble unit further includes a cage for said ball member received in said grooves of said drum member and said ring member.

17. A power driven hammer drill as defined in claim 15, wherein said finger of said ring member is connected with said driving element.

18. A power driven hammer drill as defined in claim 15, wherein said driving element is formed as a cap-shaped piston having said pivot pin with ssaid transverse opening.

19. A power driven hammer drill as defined in claim 1, wherein said tool striking means has a first axis, said intermediate shaft having a second axis which is offset downwardly and laterally from said first axis of said tool striking means in a normal position of use of the hammer drill.

20. A power driven hammer drill as defined in claim 19, wherein said housing has a longitudinal central plane, said first axis of said tool striking means being located in said longitudinal central plane of said housing.

21. A power driven hammer drill, comprising a housing having an axis; a tool striking means arranged to reciprocate in said housing; drive means including a wobble unit with a limitably axially displaceable drum member and a transmitting member reciprocating said tool striking means, a drive motor formed as an electric motor with a pinion, an intermediate shaft rotatable by said drive motor, a driving gear arranged on said intermediate shaft in non-rotatable and axially displaceable manner relative thereto and engageable with said pinion of said electric motor, means for releasably coupling said intermediate shaft with said drum member of said wobble unit and including a first coupling element provided on said drum member and a second coupling element provided on said intermediate shaft and positively engageable with said first coupling element of said drum member, said first coupling element of said member being formed as an inner toothing, said second coupling element of said intermediate shaft being formed as an outer toothing, said intermediate shaft having a portion on which said drum member and said driving gear are arranged whereas said outer toothing of said intermediate shaft has a plurality of teeth arranged so that teeth provided on said portion have a reduced tooth height as compared with teeth of a remaining portion of said intermediate shaft, wherein said drum member with said inner toothing has an inner bore with a reduced cross section, whereas said outlet teething of said intermediate shaft has a transition formed between the teeth of said first mentioned portion of said remaining portion and forming an abutment for said bore with a reduced cross section, spring means arranged to act so as to bring said second coupling element of said intermediate shaft into interengagement with said first coupling element of said drum member; and switch means located outside of said housing and arranged so as to disengage said second coupling element of said intermediate shaft out of said first coupling element of said drum member against the action of said spring means.

22. A power driven hammer drill as defined in claim 21, wherein said spring means includes a spring element, said intermediate shaft having a passage which accommodates said spring element, said intermediate shaft also having a separate shaft part which is telescopably displaceable in said passage against the action of said spring element.

* * * * *